US005836811A

United States Patent [19]

Schoeps

[11] Patent Number: 5,836,811

[45] Date of Patent: Nov. 17, 1998

[54] AIR TOOL SUSPENSION DEVICE

[75] Inventor: Knut Christian Schoeps, Tyresö , Sweden

[73] Assignee: Atlas Copco Tools AB, Nacka, Sweden

[21] Appl. No.: 817,232

[22] PCT Filed: Oct. 16, 1995

[86] PCT No.: PCT/SE95/01203

§ 371 Date: Apr. 10, 1997

§ 102(e) Date: Apr. 10, 1997

[87] PCT Pub. No.: WO96/11776

PCT Pub. Date: Apr. 25, 1996

[30] Foreign Application Priority Data

Oct. 14, 1994 [SE] Sweden .................................. 9403504

[51] Int. Cl.[6] ........................................................ A22B 3/02

[52] U.S. Cl. ................................................................ 452/62

[58] Field of Search .................................... 248/317, 324, 248/664; 452/57, 62, 194, 195, 160; 119/728

[56] References Cited

U.S. PATENT DOCUMENTS

| | | | |
|---|---|---|---|
| 4,451,952 | 9/1984 | Herubel . | |
| 5,356,188 | 10/1994 | Maloberti et al. | 294/66.1 |
| 5,580,021 | 12/1996 | Gillanders | 248/330.1 |

FOREIGN PATENT DOCUMENTS

| | | |
|---|---|---|
| 2 509 424 | 12/1988 | France . |
| 539 125 | 11/1931 | Germany . |
| 26 23 366 | 12/1977 | Germany . |
| 457 424 | 12/1988 | Sweden . |
| 2 213 757 | 8/1989 | United Kingdom . |

*Primary Examiner*—Ramon O. Ramirez
*Assistant Examiner*—Long Dinh Phan
*Attorney, Agent, or Firm*—Frishauf, Holtz, Goodman, Langer & Chick

[57] ABSTRACT

A suspension device for providing a universally movable support of a pneumatic power tool of the type having a housing (10) with a pistol grip handle (11), and comprises an arc-shaped yoke (31) with a slip member (38) movably guided thereon and connectable to an overhead balancing device. A first end (32) of the yoke (31) is connected to the tool housing (10) by a swivel connection (33, 35) at a location opposite the tool handle (11), and a second end (34) of the yoke (31) is rigidly secured to the rotatable inlet part (20) of a right angle air supply conduit swivel connection (17) to be mounted at the outer end of the tool handle (11), wherein the inlet part (20) of the swivel connection (17) is rotatable in a plane transverse to the longitudinal direction of the tool handle (11).

10 Claims, 3 Drawing Sheets

AIR TOOL SUSPENSION DEVICE

This invention relates to a suspension device intended to provide a universally movable support for a pneumatic power tool.

In particular, the invention concerns a suspension device for a pneumatic power tool having a housing with a pistol grip handle. The suspension device comprises an arc-shaped yoke and a slip member which is movably guided on the yoke and connectable to an overhead balancing device.

BACKGROUND OF THE INVENTION

Devices of the above described type are previously known, for example through GB 2,213,757 and FR 2,509,424.

The device shown in GB 2,213,757 is adapted to a pistol type pneumatic tool which in a conventional manner has its pressure air conduit connection located to the outer end of the handle. In tools like this, there is a practical problem to arrange the pressure air supply conduit such that it does not interfere with the handling of the tool and/or the operator's movement pattern.

The most desirable way to get the air supply hose out of the way is to direct it upwards to an overhead pressure air main connection. This, however, is not a satisfactory solution to the hose handling problem of the device shown in GB 2,213,757, because in the normal or most common operating position of the illustrated tool, the handle is directed downwards as is the air hose connection. Leading the air hose upwards to an overhead connection point would still cause an awkward handling of the tool.

The device described in FR 2,509,424 comprises a tube-shaped yoke which forms part of the pressure air supply conduit. The tool illustrated in connection with this known suspension device is of a special design with two lateral swivel connections for the suspension yoke. This known device is advantageous in that it enables a favorable air hose arrangement, but suffers from the drawback of being expensive and limited in use to a specially designed power tool.

OBJECT OF THE INVENTION

In contrast to both of the two above described prior art devices, it is an object of the present invention to provide a structurally simple air tool suspension device which is usable with standard type pistol grip power tools, and which not only provides a universal movability of the tool, but enables an out-of-the-way location of the pressure air hose.

BRIEF DESCRIPTION OF THE DRAWINGS

Further characteristics and advantages of the invention will appear from the following specification and claims.

A preferred embodiment is below described in detail with reference to the accompanying drawings.

DETAILED DESCRIPTION

Figure 1:
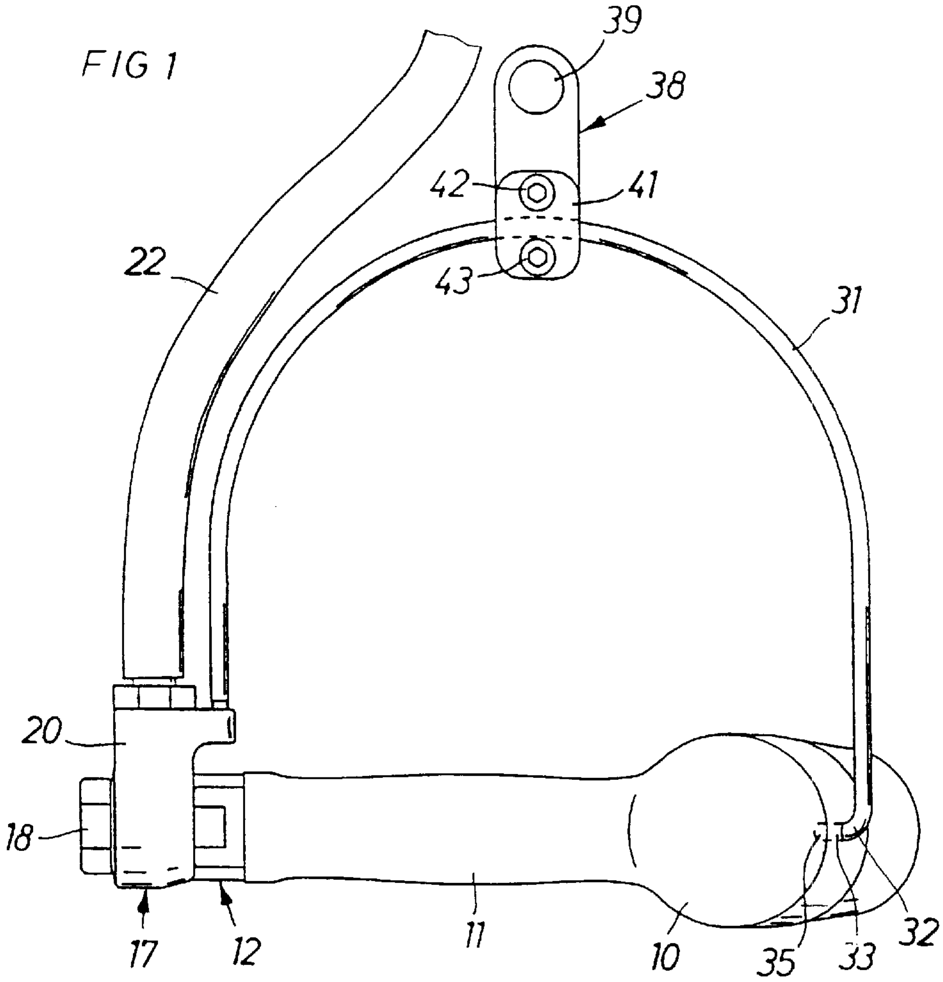
FIG. 1 shows a front view of a suspension device according to the invention.

The suspension device shown in FIGS. 1–4 is for use in supporting of a standard type pneumatic power tool, particularly a power wrench, comprising a housing 10 with a pistol grip handle 11. A motor located in the housing 10 is supplied with motive pressure air through an inlet connection 12 at the outer end of the handle 11 and exhausts air through an outlet diffusor 13 also located at the outer end of the handle 11. The motor operation is controlled by a throttle valve 14, and a square ended output shaft 15 is intended to carry a nut socket for engagement with a screw joint to be tightened.

The inlet connection 12 comprises a right angle swivel joint 17 which includes a threaded nipple 18 for mounting in a threaded socket portion 19 in the handle 11 and a banjo type inlet part 20. The latter is rotatably supported on the nipple 18 and is formed with a threaded socket 21 for connection of an air supply hose 22.

Figure 4:
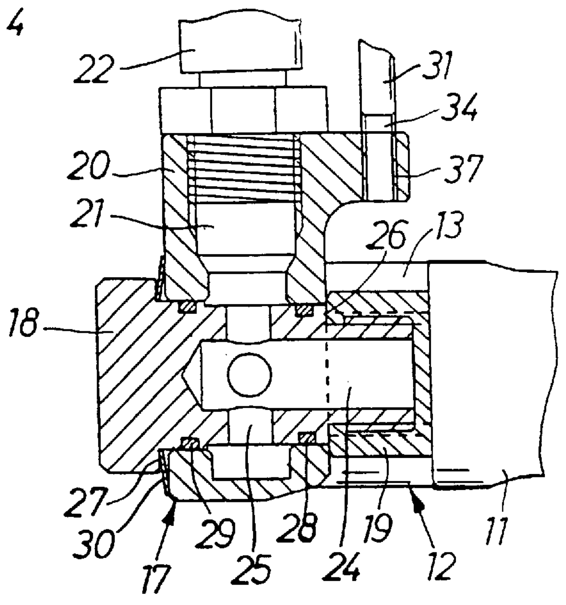
FIG. 4 shows, on a larger scale and partly in section, a fractional view of the device in FIG. 1.

As shown clearly in FIG. 4, the nipple 18 is formed with a central passage 24 and a couple of lateral openings 25 for communication with the socket 21 of the inlet part 20. The nipple 18 also comprises two annular shoulders 26, 27, one 26 of which defines the axial position of the nipple 18 relative to the handle 11, whereas the other shoulder 27 forms an axial support for the inlet part 20. Two O-rings 28, 29 form a seal means between the inlet part 20 and the nipple 18.

Between the outer shoulder 27 and the inlet part 20, there is inserted a Belleville type spring washer 30 the purpose of which is to accomplish a friction lock between the two parts 18, 20 of the swivel joint 17.

The main part of the suspension device comprises an arc-shaped yoke 31 of stiff wire on which threads are cut at both ends. At the first end 32 of the yoke 31, the thread is cut on a right angle bent over portion 33, whereas the second end 34 of the yoke 31 is straight. The first end 32 is rotatably journalled relative to the tool housing 10 in that the threaded bent-over portion 33 engages a threaded bore 35 in the housing 10. This bore 35 is located to a position on the housing 10 right opposite to the handle 11.

The second end 34 of the yoke 31 is rigidly secured to the inlet part 20 of the swivel joint 17 in that the threaded second end 34 of the yoke engages a threaded bore 37 extending in parallel with the air hose 22 connecting socket 21. See FIG. 4. This means that the yoke 31 and the air supply hose 22 extend in parallel.

On the yoke 31, there is movably guided a slip member 38 which is formed with an eye 39 for connection to the wire of a balancing device located in an overhead position. The balancing device is not illustrated or described in this specification, because it may be of any commercially available type and does not form part of this invention.

The slip member 38 is also formed with a groove 40 for receiving the yoke 31, and a lock plate 41 bridges the groove 40 and is clamped into a frictional engagement with the yoke 31 by two screws 42, 43.

Figure 2:
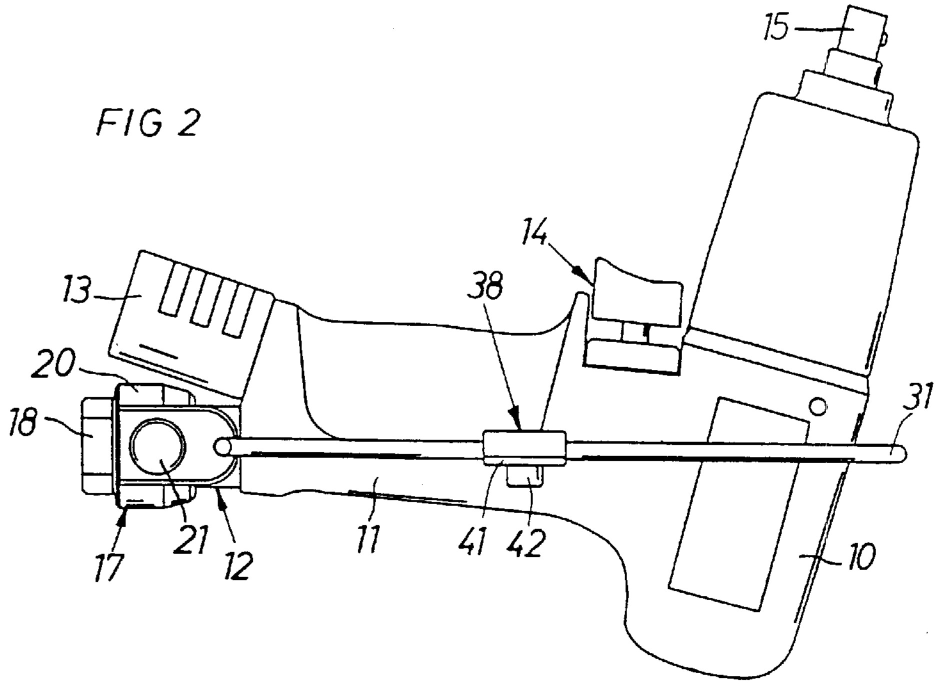
FIG. 2 shows a top view of the device in FIG. 1.
Figure 3:
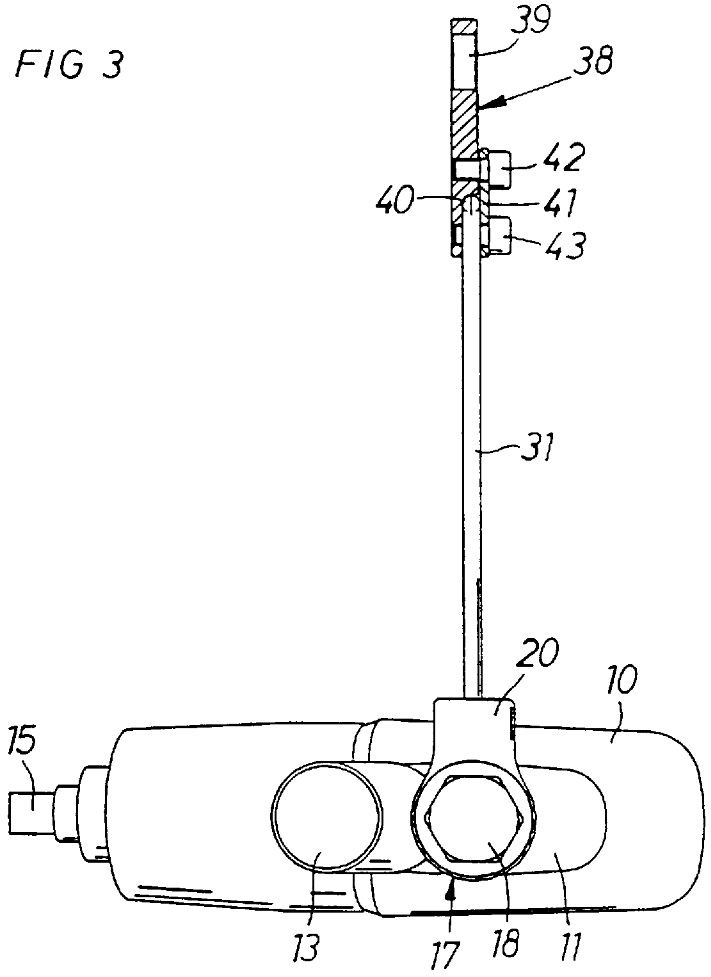
FIG. 3 shows a side view of the device in FIG. 1.

When the yoke 31 via the slip member 38 is connected to a balancing device, and the air supply hose 22 is connected to an overhead air main, the power tool is supported in the position shown in FIGS. 1–3. To change the position of the tool relative to the suspension direction, the operator merely has to twist the tool handle 11 to thereby displace the yoke 31 relative to the slip member 38 and/or apply a tilting force on the tool to overcome the friction force of the spring washer 30. Due to the friction forces accomplished by the spring washer 30 in the swivel joint 17 and by the lock plate 41 of the slip member 38, the tool will always remain in the position it was left.

Figure 5:
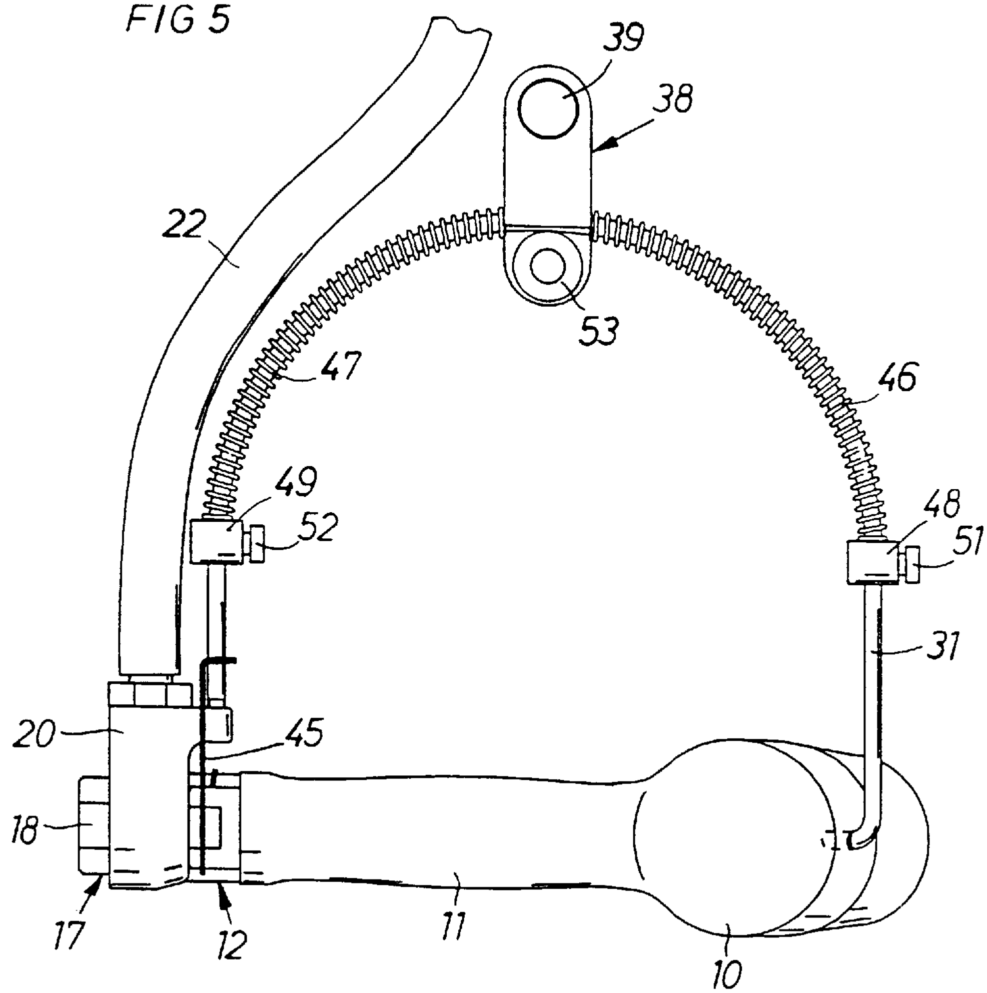
FIG. 5 shows a front view of a suspension device according to an alternative embodiment of the invention.

In FIG. 5, there is shown an alternative embodiment of the invention, wherein the friction couplings between the yoke 31 and the slip member 38 as well as between the inlet part 20 and the nipple 18 of the swivel joint 17 are exchanged by spring means.

Accordingly,instead of the friction coupling formed by the spring washer 30, the swivel joint 17 is provided with a torsion spring 45. The latter is wound around the socket portion 19 of the handle 11 and is supported by the yoke 31 on to the outlet diffusor 13. The arrangement of the spring 45 is intended to compensate for the gravitation related moment acting on the tool and, hence, balance the tool in a desired neutral position.

In order to obtain a desired neutral position of the yoke 31 in relation to the slip member 38, two multi-loop compression springs 46, 47 are mounted on the yoke 31 on opposite sides of the slip member 38 to urge the latter into a neutral position. This position is adjustable by changing the positions of two spring supports 48, 49 which are arrestable on the yoke 31 by means of lock screws 51, 52.

In this embodiment of the invention, the slip member 38 comprises a pulley 53 for low friction support of the yoke 31, and due to the employment of springs instead of friction couplings the different working positions of the tool are easily obtained and the tool is always to be found in a neutral position despite what position it was left in after a previous operation cycle.

I claim:

1. A suspension device for universally movably supporting a pneumatic power tool having a housing (10) and a tool handle (11), the suspension device comprising:

an arc-shaped yoke (31); and a slip member (38) movably guided on said yoke (31) and connectable to an overhead balancing device, wherein:

a first end (32) of said yoke (31) comprises a swiveled pivot (33, 35) for mounting to the tool housing (10) at a location opposite to the tool handle (11), and a second end (34) of said yoke (31) is rigidly connected to a rotatable inlet part (20) of a right angle air supply conduit swivel connection (17) to be mounted at an outer end of the tool handle (11), said inlet part (20) being rotatable in a plane substantially transverse to a longitudinal direction of the tool handle (11).

2. The device according to claim 1, wherein said second end (34) of said yoke (31) is connected to said inlet part (20) in parallel with the inlet direction of an air supply conduit (22) connected to said swivel connection (17).

3. The device according to claim 1, wherein said swivel connection (17) comprises a first spring (45) which urges the power tool into a desired neutral position relative to said yoke (31).

4. The device according to claim 1, wherein a second spring (46–52) is provided on said yoke (31) to bias said yoke (31) into a desired neutral position relative to said slip member (38).

5. The device according to claim 4, wherein said spring (46–52) is adjustable to enable a change of said neutral position.

6. The device according to claim 1, wherein said swivel connection (17) comprises a friction coupling (27, 30) which prevents the power tool from unintentionally changing position relative to said yoke (31).

7. The device according to claim 2, wherein said swivel connection (17) comprises a first spring (45) which urges the power tool into a desired neutral position relative to said yoke (31).

8. The device according to claim 2, wherein a second spring (46–52) is provided on said yoke (31) to bias said yoke (31) into a desired neutral position relative to said slip member (38).

9. The device according to claim 8, wherein said second spring (46–52) is adjustable to enable a change of said neutral position.

10. The device according to claim 2, wherein said swivel connection (17) comprises a friction coupling (27, 30) which prevents the power tool from unintentionally changing position relative to said yoke (31).

* * * * *